United States Patent
Li et al.

(10) Patent No.: US 8,959,187 B2
(45) Date of Patent: Feb. 17, 2015

(54) METHOD AND SYSTEM FOR PROXIMITY-BASED INFORMATION RETRIEVAL AND EXCHANGE IN AD HOC NETWORKS

(75) Inventors: Michael B. Li, Fremont, CA (US); Gene Shehktman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2517 days.

(21) Appl. No.: 10/785,797

(22) Filed: Feb. 23, 2004

(65) Prior Publication Data

US 2005/0188062 A1 Aug. 25, 2005

(51) Int. Cl.
*G06F 15/177* (2006.01)
*H04W 8/00* (2009.01)
*H04L 29/08* (2006.01)
*H04W 8/26* (2009.01)
*H04W 48/08* (2009.01)
*H04W 84/18* (2009.01)

(52) U.S. Cl.
CPC ............. *H04W 8/005* (2013.01); *H04L 67/306* (2013.01); *H04W 8/26* (2013.01); *H04W 48/08* (2013.01); *H04W 84/18* (2013.01); *H04L 67/24* (2013.01)
USPC ........................................................ 709/220

(58) Field of Classification Search
USPC ........................................................ 709/220
See application file for complete search history.

(56) References Cited

U.S. PATENT DOCUMENTS

| | | | |
|---|---|---|---|
| 5,638,050 A | 6/1997 | Sacca et al. .................... | 340/571 |
| 5,686,891 A | 11/1997 | Sacca et al. .................... | 340/571 |
| 6,026,297 A * | 2/2000 | Haartsen ..................... | 455/426.1 |
| 6,252,884 B1 * | 6/2001 | Hunter .......................... | 370/443 |
| 6,665,521 B1 * | 12/2003 | Gorday et al. ............. | 455/67.11 |
| 6,975,613 B1 * | 12/2005 | Johansson ..................... | 370/338 |
| 7,113,975 B2 * | 9/2006 | Nakayama et al. ........... | 709/204 |
| 7,302,256 B1 * | 11/2007 | O'Hara et al. ................ | 455/418 |
| 7,310,676 B2 * | 12/2007 | Bourne ......................... | 709/227 |
| 7,522,551 B2 * | 4/2009 | Giaimo et al. ................ | 370/328 |
| 2002/0040389 A1 * | 4/2002 | Gerba et al. .................. | 709/219 |
| 2002/0075940 A1 * | 6/2002 | Haartsen ....................... | 375/132 |

(Continued)

OTHER PUBLICATIONS

R. Borovoy, et al., "Meme Tags and Community Mirrors: Moving from Conferences to Collaboration," 1998 ACM Conference on Computer Supported Cooperative Work, 1-10, 1998, ACM Press.

(Continued)

*Primary Examiner* — Ninos Donabed
*Assistant Examiner* — Thomas Richardson
(74) *Attorney, Agent, or Firm* — Meyertons, Hood, Kivlin, Kowert & Goetzel, P.C.

(57) ABSTRACT

A network has clients and a server. The clients can discover and be discovered by each other. Discovery includes emitting requests to and acquiring identifying information from clients within a certain geographical range. A discovering client sends all identifying information to the server. The server includes client information database and topological map, comprised of nodes representing clients and edges indicating the discovery of one client by another. When the server receives identifying information from the discovering client, the server updates the topological map and determines which neighboring clients of the discovering client matches the match criteria of the discovering client. The server may determine a discovery schedule detailing which client should discover next. The server may send the match information and discovery schedule to the discovering client, discovered clients, or a third party. The server may also store this information.

22 Claims, 6 Drawing Sheets

(56) References Cited

U.S. PATENT DOCUMENTS

| | | | | |
|---|---|---|---|---|
| 2002/0176391 | A1 | 11/2002 | Hermann et al. | 370/338 |
| 2003/0036398 | A1* | 2/2003 | Asakawa | 455/503 |
| 2003/0096576 | A1* | 5/2003 | Salonidis et al. | 455/41 |
| 2003/0229677 | A1* | 12/2003 | Allan | 709/217 |
| 2004/0009769 | A1* | 1/2004 | Yokoyama | 455/423 |
| 2004/0085947 | A1* | 5/2004 | Ekberg et al. | 370/349 |
| 2005/0038876 | A1* | 2/2005 | Chaudhuri | 709/219 |
| 2005/0048961 | A1* | 3/2005 | Ribaudo et al. | 455/419 |
| 2005/0130634 | A1* | 6/2005 | Godfrey | 455/414.1 |
| 2006/0120301 | A1* | 6/2006 | Falck et al. | 370/254 |

OTHER PUBLICATIONS

L. Holmquist, et al., "Supporting Group Collaboration with Inter-Personal Aware Devices," J. of Personal Technologies, vol. 3(1-2), p. 1321-1339, 1999, Springer Verlag.

G. Kortuem, "Proem: A Peer-to-Peer Computing Platform for Mobile Ad-hoc Networks," ACM Sigmobile Mobile Computing and Communications Review (MC2R), vol. 6, No. 4, Oct. 2002.

G. Kortuem, et al., "When Peer-to-Peer comes Face-to-Face: Collaborative Peer-to-Peer Computing in Mobile Ad hoc Networks," Proceedings of 2001 Int'l Conference on Peer-to-Peer Computing, Aug. 27-29, 2001, Linkoping, Sweden, 2001.

P. Dahlberg, et al., "Proxy Lady: Mobile Support for Opportunistic Communication," Scandinavian J. of Info. Sys., 13(1), 2001.

J. Bergvist, et al., "Location Awareness and Local Mobility," Proceedings of $22^{nd}$ IRIS Conference, Univ. of Jyväskylä Press, 1999.

S. Bjork, et al., "Pirates! Using the Physical World as a Game Board," Interact 2001, IFIP TC.13, Conference on Human-Computer Interaction, Jul. 9-13, 2001, Tokyo, Japan.

T. Kindberg, et al., "People, Places, Things: Web Presence for the Real World," Mobile Networks and Applications, 7(5), pp. 365-376, Oct. 2002.

T. Kindberg, "Implementing Physical Hyperlinks Using Ubiquitous Identifier Resolution," $11^{th}$ Int'l World Wide Web Conference, Honolulu, HI, May 7-11, 2002.

T. Salonidis, et al., "Distributed Topology Construction of Bluetooth Personal Area Networks," Proceedings of IEEE Infocom 2001, Anchorage, AK, 2001.

T. Salonidis, et al., "Proximity awareness and fast connection establishment in Bluetooth," Proceedings of the $1^{st}$ ACM Workshop on Mobile Ad Hoc Networking and Compubint, Boston, MA, 2000.

M. Nidd, "Service Discovery in DEAPspace," IEEE Personal Communications, pp. 39-45, Aug. 2001.

* cited by examiner

| User/ Identifying Information | Profile Name | Client Information | Match Criteria | Match Information |
|---|---|---|---|---|
| John/ User1 | Business | Lawyer | Paralegal | www.xyz.com/JohnNeedsAParalegal.html |
| | Personal | Cat lover, can tolerate dogs | Can tolerate cats | www.xyz.com/JohnLovesCats.html |
| Kimberly/ User2 | Business | Paralegal | Lawyer | www.abc.com/KimberlyNeedsAJob.html |
| | Shopping | Shoe lover | Shoe sales | www.abc.com/KimberlyNeedsShoes.html |
| Frank/ User3 | Business | Shoe seller | Shoe lovers | www.franks-shoes.com/ |
| | Personal | Cat hater, dog lover | Can tolerate dogs | www.franks-site.com/frank.wml |
| Lynda/ User4 | Personal | Dog hater, can tolerate cats | Does not have a dog | www.lyndas-site.com/aboutme.htm |
| ... | ... | ... | ... | ... |

Figure 3

METHOD AND SYSTEM FOR PROXIMITY-BASED INFORMATION RETRIEVAL AND EXCHANGE IN AD HOC NETWORKS

The present invention relates generally to networks, and particularly to a computer network, the elements of which can detect other elements that match a predetermined criteria.

BACKGROUND OF THE INVENTION

Computing technology has become small enough and useful enough that the general public is now carrying small computing devices on a daily basis. Initially designed to perform a specific function, such as voice communication or storing a personal address book, these devices are increasingly becoming multi-faceted in their capabilities. In addition to providing a platform upon which a wide array of applications can run, these devices are arriving on store shelves with a number of built-in technologies such as short range connectivity, like Bluetooth and IR, and Internet connectivity, like WiFi and General Packet Radio Service (GPRS). Based on these combinations of technology, it is now possible to offer products and services that find and match users based on their location and/or proximity.

Along with these advances comes a broader acceptance of the usage of those technologies for social purposes. There is an increasing number of people who are comfortable with, and accustomed to, using technology for social means, whether using the Internet to find a date, or using their PDAs to beam business cards. This convergence of technology and social interaction creates an opportunity for a new group of location or proximity based applications. These applications are aimed for fostering interactions, enhancing existing relationships, and enabling collaboration.

Ubiquitous computing envisions "smart," everyday items that sense their surroundings and cooperate with one another. These include cell phones, PDAs, laptops, mice, keyboards, printers, cameras, earpieces for telephones, pens, televisions, and other everyday items, equipped with an Internet connection and a Bluetooth transceiver (or other recognition device). For example, a device equipped with a Bluetooth transceiver creates a short-range communication space radiating in all directions from the device, like a bubble with the device in the center. When individuals with devices equipped with Bluetooth transceivers come within close physical proximity, their respective communication spaces (or bubbles) overlap, enabling their personal mobile devices to discover and identify each other. This can be used to facilitate, augment, and promote face-to-face interactions. Furthermore, the device can be associated with a commercial entity, such as a retail outlet. This enables value-added, personalized consumer-business interactions.

All this provides opportunities for these devices, and the applications on these devices, to change how people interact and cooperate, not only between people but also between people and businesses. They contribute to a richer more valuable social experience and help promote sociability in an increasingly impersonal world. Human beings have an inherent characteristic desire for social interactions. Any encounter with another person offers a chance for conversation, for informal information exchange, for collaboration towards a common goal, and to pursue and further personal goals.

There are many methods and systems for implementing these kinds of location or proximity based applications. For instance, PanGo Proximity Platform™, www.saw-you.net, www.imahima.com, and www.trepia.com use proximity based applications. However, these current technologies have several shortcomings, including privacy issues, scalability issues, interoperability issues, and overall user experience. In fact, the majority of such systems are not truly location-based but rather depend on constant user input to demonstrate value. Furthermore these products and services are focused on specific geographical regions, and are targeted for specific uses (e.g., dating, finding nearby friends).

Several proximity aware systems have been developed. These proximity aware systems are described in R. Borovoy, et al., "Meme Tags and Community Mirrors: Moving from Conferences to Collaboration", Proceedings of 1998 ACM Conference on Computer Supported Cooperative Work, 1998, ACM Press; Holmquist, et al., "Supporting Group Awareness with Inter-Personal Awareness Devices", Journal of Personal Technologies, Vol. 3(1-2), p. 1321, Springer Verlag, 1999; G. Kortuem, "Proem, A Middleware Platform for Mobile Peer-to-Peer Computing", ACM SIGMOBILE Mobile Computing and Communications Review (MC2R), Special Feature on Middleware for Mobile Computing, Vol. 6, No. 4, October 2002; and G. Korteum, et al., "When Peer-to-Peer Comes Face-to-Face: Collaborative Peer-to-Peer Computing in Mobile Ad-hoc Networks", Proceedings of 2001 International Conference on Peer-to-Peer Computing, August 27-29, 2001, Linkoping, Sweden, 2001. Some of the proximity aware systems utilize a purely peer-to-peer method of information exchange. There are many drawbacks to such systems. For example, peer-to-peer systems require a fairly large specialized application residing on the device. These applications can be resource intensive, consuming relatively large amounts of CPU time, memory, and storage, all of which are relatively scarce on mobile devices. Additionally, peer-to-peer systems are limited to only the discovery of the nearest neighbors of each of the devices. Data synchronization is also unsatisfactory, since neighboring devices are not aware of any changes in data on a nearby device until that data is re-sent. Peer-to-peer systems also have availability drawbacks because such devices must stay within a predetermined range of each other during the time required to establish pair-wise connections and perform data exchange. Finally, peer-to-peer systems sometimes present the problem of disclosing private information that users have not explicitly authorized to be disclosed.

Other proximity aware systems add a storage server. These proximity aware systems are described in P. Dahlber, et al., "Proxy Lady: Mobile Support for Opportunistic Communication", Scandinavian Journal of Information Systems 13(1), 2001; and J. Bergvist, et al., "Location Awareness and Local Mobility: Exploring Proximity Awareness", Proceedings of the $22^{nd}$ IRIS Conference (Information Systems Research Seminar in Scandinavia), University of Jyväskylä Press, 1999. The storage server is only used for periodic non-real-time data synchronization. This approach alleviates some of the storage requirements on the devices. Additionally proximity aware systems exist that are used specifically for gaming purposes. One such system is described in S. Björk, et al., "Pirates!—Using the Physical World as a Game Board", Interact 2001, IFIP TC.13 Conference on Human-Computer Interaction, July 9-13, Tokyo, Japan. All of the above mentioned limitations hold, however, because the data exchange between devices in these systems is still peer-to-peer. All of these systems used specialized hardware and communication protocols specially designed for that particular system.

Other proximity aware systems add a registry server. These systems are described in T. Kindberg, et al., "People, Places, Things: Web Presence for the Real World", Mobile Networks and Applications (MONET), 7(5), October 2002, 365-376 and T. Kindberg, et al., "Implementing physical hyperlinks using ubiquitous identifier resolution", Proceedings of the Eleventh International World Wide Web Conference, WWW2002, Honolulu, Hi., USA, 7-11 May 2002, ACM, 2002, 191-199. This registry server acts as a static listing of name-value pairs associating arbitrary information with physical objects. This allows objects to be "tagged" with information, however no context-aware matching is performed.

The highly dynamic nature of mobile ad-hoc networks require timely and efficient algorithms through which a computing device can detect the presence of neighboring devices. These algorithms should enable moving devices to discover each other without overloading the network with traffic. Several distributed decentralized discovery algorithms have been proposed (e.g., Theodoros Salonidis, et al., "Distributed Topology Construction of Bluetooth Personal Area Networks", Proceedings of IEEE INFOCOM 2001, Anchorage, Ak., 2001; Theodoros Salonidis, et al., "Proximity Awareness and Fast Connection Establishment in Bluetooth", Proceedings of the First Annual ACM Workshop on Mobile Ad Hoc Networking and Compubint (MOBIHOC), Boston, Mass., 2000; Michael Nidd, "Service Discovery in DEAPspace", IEEE Personal Communications, pp. 39-45, August 2001; Salonidis, et al., U.S. patent application Pub. No. US 2003/0096576 A1, "Method and Apparatus for Connecting Devices Via an Ad Hoc Wireless Communication Network"; and Hermann, et al., U.S. patent application Pub. No. US 2002/0176391 A1, "Method and Device for Prompt and Efficient Service Discovery in Wireless Networks"). The decentralization of these ad-hoc networks for which these algorithms are employed are a drawback that usually results in relatively complex algorithms.

SUMMARY OF THE INVENTION

The present invention is a system and method for devices equipped with recognition equipment (e.g., Bluetooth transceivers) to identify other devices that match a predetermined criteria. The present invention comprises a network of clients equipped with recognition equipment and a server (although the present invention may include multiple servers and a single device may function as both a client and a server).

The clients are capable of discovering one another and are capable of being discovered by one another. The process of discovery is defined to be the emission of inquiries followed by acquisition of identifying information from neighboring clients. A discovering client uses its recognition equipment to discover other clients, and the result is that the discovering client gains identifying information about the discovered clients.

Additionally, the server stores user profiles provided by the user themselves. One user may have multiple profiles, one of which is active at any given time. Based upon information supplied by a client, the server first determines that the client is within a predetermined distance of a plurality of other clients. The server then determines which of the plurality of other clients are clients of users with user profiles that satisfies the match criteria of the active profile of the first client.

In one embodiment, when a first user requests information about other users matching a criteria, the server searches through the user profiles, identifies the users who match the first user's criteria and are near the first user, and sends to the first user information about the matching users who are near the first user. The information sent to the first user about the matching users is information that was created by the matching users and approved by the matching users to be disclosed to other users. The first user may view this information using applications that are already commonly found on "smart" everyday items (e.g., web browser and Internet connection).

A client is in active state (SA) when the client is capable of discovering other clients. A client is in passive state (SP) when the client is capable of being discovered by other clients. A client can only be in one state at a time. A primary client is a client that discovers other clients. A secondary client is a client that has been discovered by the primary client. A cycle starts at the primary client's entry into SA and discovery of a secondary client, followed by the transmission of the secondary client's identifying information to the server and the primary client's entry into SP, and ending with the server's matching of the discovering client with other clients based upon data stored on the server. Clients are not permanently designated primary clients or secondary clients—client designation only lasts as long as a single cycle. A client becomes a primary or secondary client depending on the point in time examined and the state in which the client exists at that point in time. Further, there need not be only a single primary client at any one time.

The server includes a client information database that stores client information associated with clients in the network. This client information includes client identifying information (like a client or user ID), client information, a match criteria for each client that determines the criteria that each client is searching for, and match information offered upon the determination that one client matches another. The server further includes a matcher that identifies clients that are neighbors (immediate or not) of the primary client. The matcher then searches the client information database to determine whether any of the neighboring clients have client information that matches the match criteria of the primary client. If so, the server sends the match information associated with the matching neighboring clients to at least the primary client.

The server may also store a topological map of the clients. The topological map consists of nodes (or vertices) that represent each client and edges between the nodes. A single edge between two nodes indicates that the client represented by one node discovered the client represented by the other node. One less than the number of edges between two nodes indicates the number of clients in a chain of discovering clients that separate the two clients represented by the two nodes. If the geographical radius within which each client can discover other clients is n meters, then two clients are separated by the number of meters up to n times the number of edges between the two nodes representing the two clients. The server may also include a topological mapper that updates the topological map when information is received from a primary client.

Further, the server may also include a scheduler that can coordinate the times at which each client goes into SA. This is useful when a group of clients seem not to be moving relative to each other. The scheduler, by coordinating the times at which each client in the group goes into SA, can reduce the amount of instances that each client must go into SA, which in turn reduces redundant discoveries of the same clients by all the clients in the group.

The present invention solves the problems confronted by the existing technology. Since the present invention does not necessitate peer-to-peer interaction, no resource intensive application must reside on the user devices. Also, since the present invention discloses information about users that users have pre-authorized to be disclosed, the privacy problem is ameliorated. The present invention is not targeted for any specific use because each user may have multiple profiles related to different aspects of their lives. The profiles can be tailored to aid the user in finding dating partners or people who share the same interest or hobbies, finding business contacts, finding people who share a common goal (e.g., a carpool partner, or a shared ride to a common airport at a certain time), matching buyers and sellers of the same goods (including allowing sellers to send coupons, promotions, or sale information to interested buyers), and efficiently allocating tasks between groups of people to minimize the number of locations to which each person must travel to get all the tasks done. Also, the present invention is not focused on any geographical region, but available to all users anywhere. The present invention alleviates the problem of data synchronization between devices because the present invention serves as the repository of information for all of its users. Further, since the present invention stores the user profiles and uses applications already on the user devices to display information, there is no need for a resource intensive application to reside on the user devices. Finally, since the present invention includes a centralized server that can schedule the actions of the devices relative to each other, it can be thought of as a moderator in a discussion group to bring order to a group where everyone is trying to talk at the same time. The present invention thus results in a simpler system, a smaller client application, and less redundant discovery.

BRIEF DESCRIPTION OF THE DRAWINGS

Additional objects and features of the present invention will be more readily apparent from the following detailed description and appended claims when taken in conjunction with the drawings, in which:

FIG. 3 is an example of the information the client information database may contain.

DESCRIPTION OF THE PREFERRED EMBODIMENTS

Figure 1:
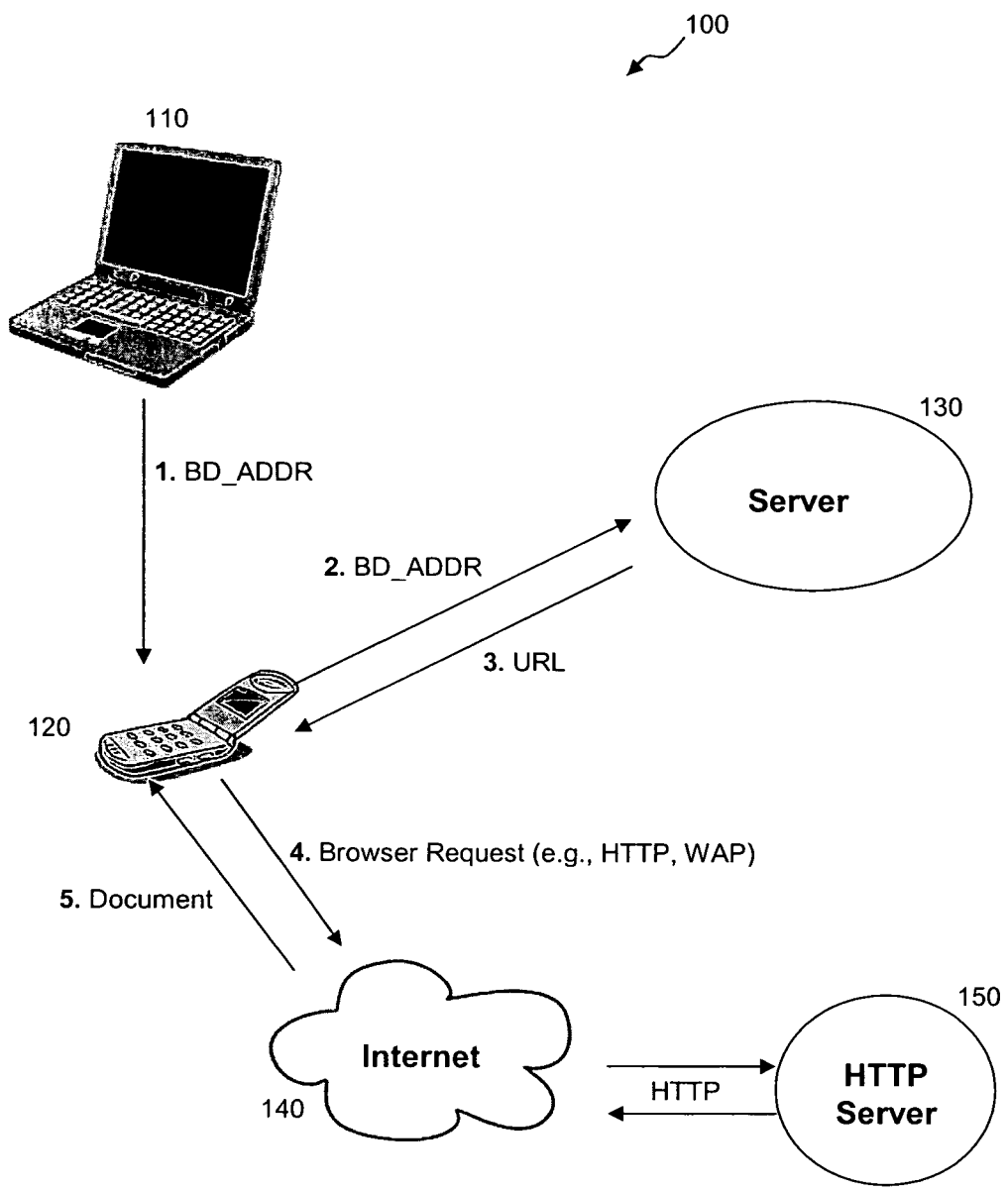
FIG. 1 depicts a server and several clients that make up the network described in the present invention.

Referring to FIG. 1, there is shown network 100 having server 130 and several clients 110, 120. Server 130 and clients 110, 120 each include one or more processors for executing instructions in one or more computer programs. The present invention is not limited to having only one server; multiple servers may function in the present invention. In this particular embodiment, primary client 120 is a Bluetooth enabled cellular phone, and secondary client 110 is a Bluetooth enabled laptop computer. Bluetooth technology enables a device equipped with a Bluetooth transceiver to recognize devices that are also equipped with Bluetooth transceivers. Bluetooth employs a type of discovery in which a discovering client uses its recognition equipment to discover other clients, and the result is that the discovering client gains identifying information about the discovered clients. In the present invention, primary client 120 discovers (step 1) secondary client 110, which results in primary client 120 acquiring secondary client's 110 identifying information. The identifying information identifies the device. In the event that a single user has multiple devices, each device is associated with that single user. In this embodiment, the identifying information is a Bluetooth client address (BD_ADDR), but identifying information may also include a barcode, book ISBN, serial number, or MAC address (Media Access Control address). Primary client 120 then sends (step 2) secondary client's 110 identifying information to server 130, which determines which clients match primary client's 120 match criteria.

In a further embodiment, server 130 then sends (step 3) match information to primary client 120. In this embodiment, the match information consists of URLs for the matching neighboring clients. In another embodiment, a URL for primary client 120 is sent to all the matching neighboring clients. When a client receives match information, the user is notified. Some forms of notification include an SMS (Short Message Service) text message, voice messages, web pages, and client device actions (e.g., vibration, sounds, lights, messages, incoming call, distinctive ringing, reminder sound, etc.).

Yet another embodiment includes the use of displays on clients. For example, the URLs are displayed by the client by creating an HTML, WML, or any language (markup or otherwise) document with the URLs as links. The client then displays the document, and allows a user to select the URLs. The client then selects a URL and sends a browser request (step 4) through a connection (e.g., Internet 140, LAN, WAN, etc.) to retrieve (step 5) the webpage accessible through a selected URL, and displays the webpage that is stored on server 150 on a web browser on the client. The webpage may be a description of the user that is associated with the discovered client whose match information was the selected URL. A further embodiment allows a client that accesses another client's webpage to add to or annotate the webpage, including signing guest books, and leaving messages, comments, or feedback.

Figure 2:
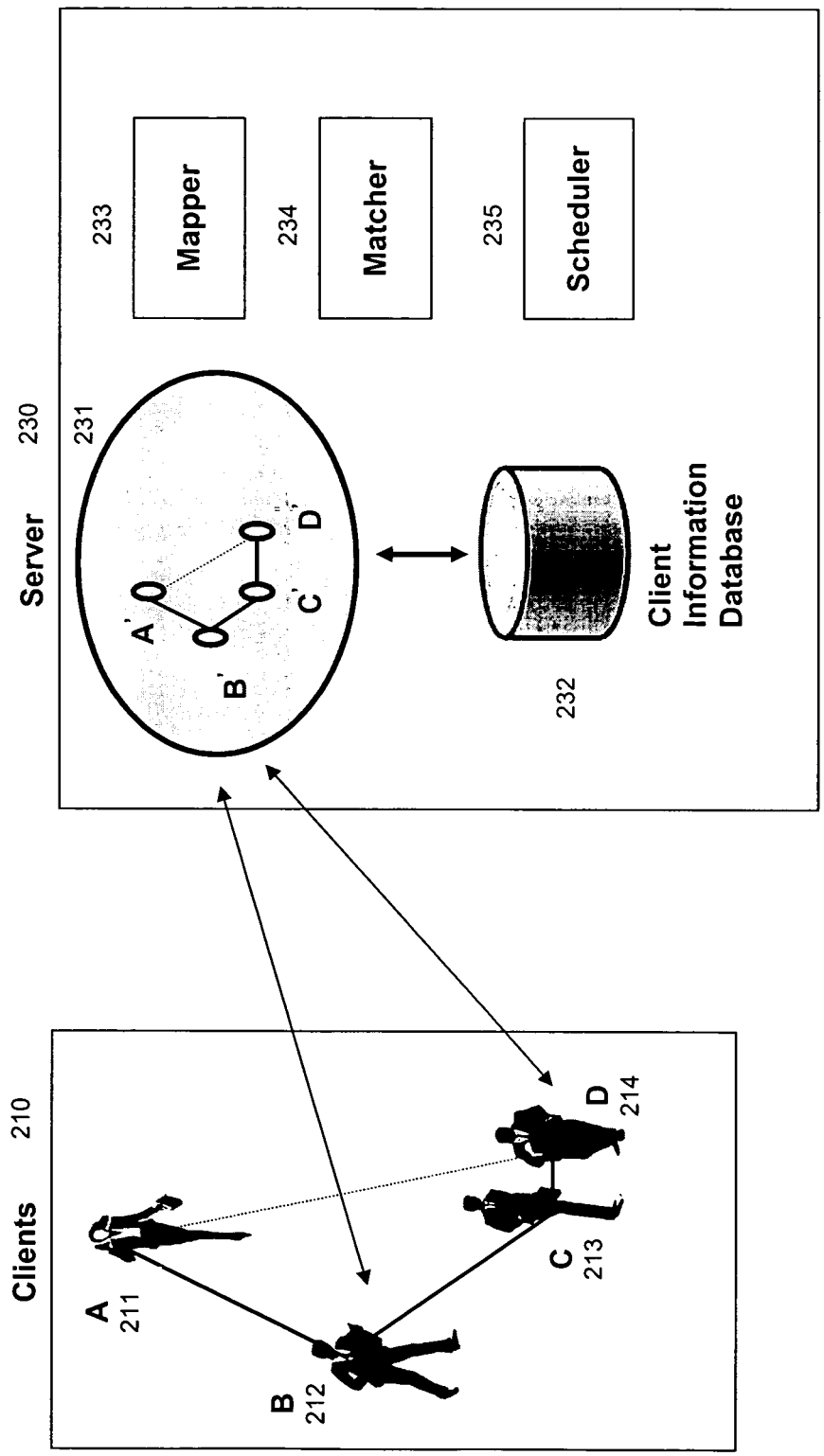
FIG. 2 is a diagram of a network incorporating a preferred embodiment of the present invention.

The preferred embodiment in FIG. 2 shows clients 210 and the representation of the same clients in topological map 231 stored on server 230. Client B 212, a primary client, discovers clients A 211 and C 213, secondary clients. Client D 214, another primary client, also discovers client C 213, a secondary client. When server 230 receives information from primary client B 212, mapper 233 updates topological map 231 using the received information. When server 230 receives information from primary client D 214, mapper 233 updates topological map 231 using the received information. A topological map consists of nodes (or vertices) that represent each client and edges between the nodes that represent one node discovering another. A single edge between two nodes indicates that the client represented by one node discovered the client represented by the other node. On topological map 231, clients 210 are represented by a group of four nodes, the B node connected to the A and C nodes, and the D node connected to the C node. Since mapper 233 updates topological map 231 upon receiving information from any primary client, the information received from several primary clients can be used to construct topological map 231 that represents all or a majority of the clients, including clients that may have been discovered by one primary client but not another. Thus, the D node is within three edges to the A node and within two edges to the B node, even though client D 214 did not discover or was not discovered by clients A 211 or B 212. This, in turn, means that clients A 211 and D 214 may be matched with each other even though neither discovered the other.

Figure 2A:
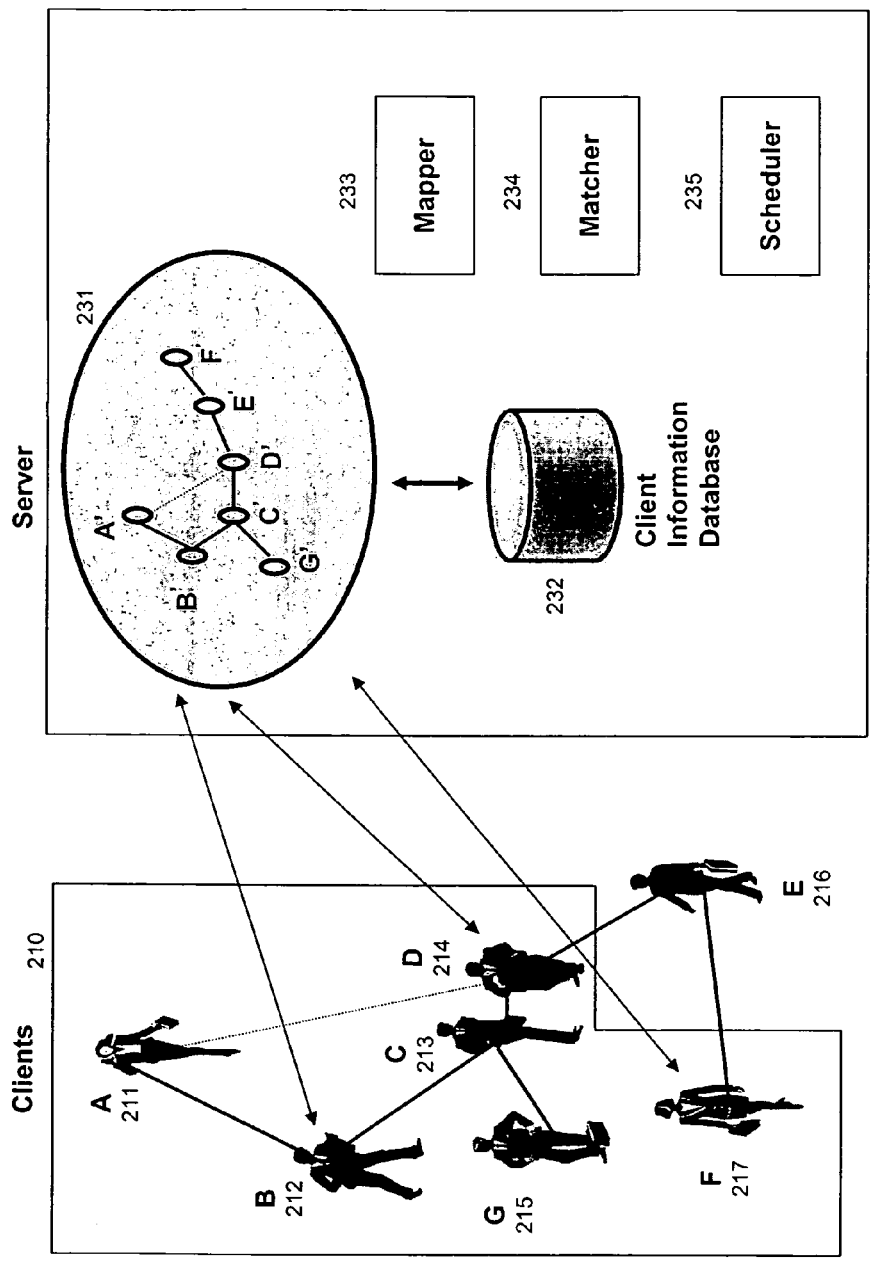
FIG. 2A is a diagram of a network incorporating another preferred embodiment of the present invention.

In another embodiment of the present invention, illustrated in FIG. 2A, a non-client device may be used to construct topological map 231. Clients 210 are generally capable of communicating identifying information to server 230. A non-client 216 is a device that is discoverable and may be capable of discovery, but incapable of communicating with server 230. A non-client device may be incapable of communicating with server 230 for a variety of reasons, one of which is that the non-client device is not registered with server 230. Referring to FIG. 2A, suppose primary clients D 214 and F 217 discover non-client E 216. Both primary clients D 214 and F 217 communicate non-client E's 216 identifying information to server 230. Mapper 233 incorporates the identifying information and updates topological map 231 to indicate that client F 217 is only two edges away from client D 214, even though clients D 214 and F 217 did not discover each other.

Referring back to FIG. 2, client information database 232 is shown. A user's profile on the client information database 232 is fully configurable by a user. For example, a user may set multiple profiles that are stored on client information database 232. The user is then able to select, even through the user's client device, the profile that the user desires to be active at a particular time. Client information database 232 stores client information, including identifying information, match criteria, and match information for each client. Client information is information about the user of a client device 210, and is used by server 230 to determine matches with other clients 210. Identifying information is information that particularly identifies each client. Match criteria is the criteria that a user wishes a matching user to possess. Match information is the information that is provided when the client whose profile includes the match information is found to have client information that matches another client's match criteria. Match information may include URL(s). Each client may have multiple profiles, and different match criteria and match information for each profile or the same match criteria and match information for all of a client's profiles.

FIG. 3 shows an example of what client information database 232 can contain. Each user may have more than one profile to accommodate the various environments and goals that each user may have. The example in FIG. 3 shows a match. John's Personal profile has match criteria "Can tolerate cats" because John is a cat lover and wishes to find a person who can tolerate cats. Lynda's Personal profile contains client information "Dog hater, can tolerate cats." Lynda's match information will be sent to John if John, when Lynda is within his vicinity, happened to have his Personal profile active. Additionally, in another embodiment, server 130 may be configured to search only active profiles when determining matches. Therefore, even though, as in FIG. 3, Lynda's Personal profile matches John's Personal profile, if Lynda's Personal profile were not active at the time server 130 was searching for matches to John's Personal profile, Lynda would not be identified as a match by server 130.

Also shown in FIG. 3 is another match. Kimberly's Shopping profile contains match criteria "Shoe sales" because Kimberly loves shoes. Frank's Shoe Store has a Business profile that contains client information "Shoe seller." If Kimberly is walking through a shopping mall and has elected her Shopping profile to be active, and Frank's Shoe Store has its Business profile active, then when Kimberly comes within the vicinity of, for example, a cash register computer at Frank's Shoe Store, then Kimberly can receive Frank's Shoe Store's match information. In this case, the match information is Frank's Shoe Store's website and may contain a promotion or sale (e.g., 20% off) that would convince Kimberly to visit Frank's Shoe Store.

Finally, FIG. 3 shows a third match. John's Business profile has a match criteria of "Paralegal" since John is a lawyer and is looking to hire a paralegal. Kimberly's Business profile has client information "Paralegal" since she is a paralegal by profession. This means that matcher 234 will list Kimberly as a matching neighbor of John and send John Kimberly's match information. In this case, Kimberly's match information is a URL leading to a website that may contain her resume.

Referring back to FIG. 2, after information from the primary client is updated to server 230, matcher 234 on server 230 identifies the neighboring clients. Matcher 234 then searches client information database 232 to determine which clients 210 have client information that matches the primary client's match criteria. Server 230 may send the match information of matching neighboring client(s) 210 to the primary client. For example, in FIG. 2, suppose matcher 234 identifies clients A 211, C 213, and D 214 as neighboring clients for primary client B 212. Further, suppose that clients A 211 and B 212 have John's Business profile and Kimberly's Business profile, respectively. Client A 211 would become a matching neighboring client. Server 230 then sends client A's 211 match information to client B 212. In another embodiment, server 230, upon determining the matching neighboring clients of a primary client, will send the primary client's match information to all the matching neighboring clients. In yet another embodiment, server 230 will store data indicating the matching clients for client A 211 or client B 212.

A preferred embodiment allows a "boundary" to be set in the determination of neighboring clients. The boundary may be in the form of a predetermined number of edges. Only clients 210 represented by nodes within a predetermined number of edges to the node representing the primary client are considered neighboring clients. For example, referring back to FIG. 2, suppose the predetermined number of edges is less than or equal to two. Then, the neighboring clients to client D 214 will only include clients B 212 and C 213. Client A 211, three edges away from client D 214, will not be included as a neighboring client. The predetermined number of edges can be selected based upon many different types of criteria, including "between x and y edges," "less than x edges," "more than y edges," etc. For example, referring to FIG. 2A, suppose the predetermined number of edges is less than two edges and suppose the geographical radius within which each client can discover other clients is ten meters. This is useful for a user who wishes to be alerted to matching users who are within twenty meters of the user. For example, if client G 215 were the primary client and the boundary set for G 215 were "less than 2 edges", then the neighboring clients for client G 215 would only include clients A 211, B 212, C 213, D214 and E216.

Another type of boundary that can be set is a numerical boundary that limits the number of clients that can be considered neighboring clients. For example, referring to FIG. 2A, if the boundary were set to two neighboring clients, and client C 213 is the primary client, then two out of the three nearest clients to client C 213 (clients B 212, D 214, or G 215) will be neighboring clients. The process to decide which two of the three can be random, on a first discovered first serve basis, or based upon any number of criteria. Again, this boundary can be many different types of criteria, including "between x and y clients," "less than x clients," "at least y clients," etc. For example, the boundary may be set to "at least three clients" if a user wished to find a group to play Charades, a game requiring at least two people to a team.

Figure 4:
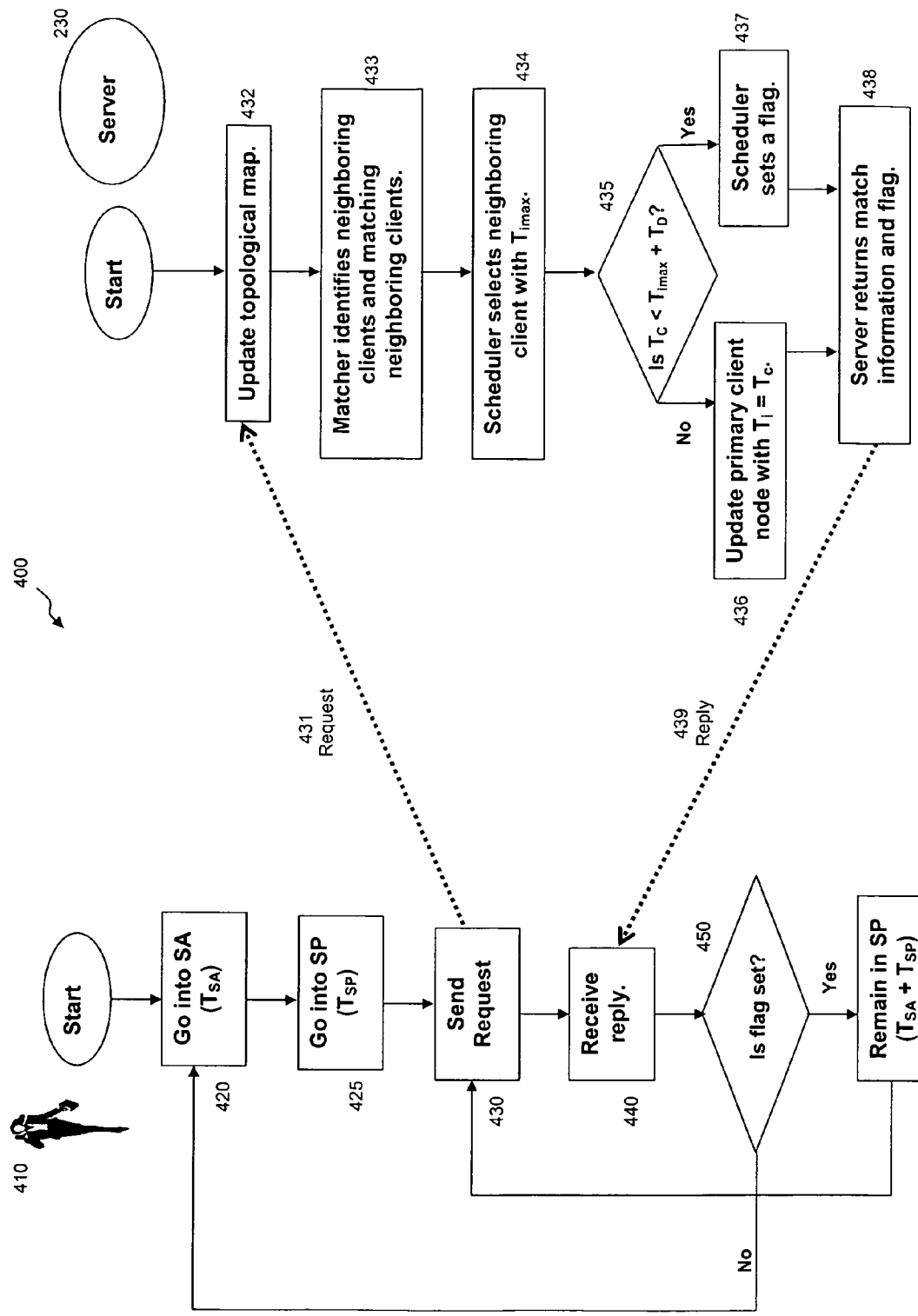
FIG. 4 is a flowchart of the steps through which a client proceeds in one embodiment of the present invention.

Referring now to FIG. 4, there is shown a flowchart 400 of the steps primary client 410 proceeds through in one embodiment of the present invention. In one embodiment of the present invention, clients 210 alternate being in active state (SA) or passive state (SP). In SA, a client is capable of discovering, but incapable of being discovered. In SP, a client is capable of being discovered, but incapable of discovering. In another embodiment of the present invention, the duration of SA is randomized between clients, thus decreasing the probability that clients will fall into synchronized cycles in which two clients always go into SA at the same time and for the same duration, which prevents the clients from discovering each other.

In FIG. 4, primary client 410 starts off in SA 420, and spends $T_{SA}$ (a time period measured in, for example, seconds) in SA. During this time, primary client 410 is capable of discovering other clients 210 but incapable of being discovered. After discovering surrounding secondary clients, primary client 410 goes into SP 425, and sends 430 the identifying information of discovered secondary clients to server 230 as a request 431.

Since a client can either be discovering or be discovered, but not both simultaneously, some embodiments provide a centralized scheduling mechanism that minimizes the overlap of two or more clients 210 in the same geographical vicinity from being in SA or SP at the same time. In one embodiment, topological map 231 is used in conjunction with a flag to indicate to a primary client whether to go into SA or to stay in SP for the duration that that primary client would have been in SA. In this embodiment, topological map 231 stored on server 230 includes a discovery timestamp ($T_i$) associated with each node. $T_i$ designates the time at which each node last performed discovery. When server 230 receives a request 431 from a primary client, server 230 first updates 432 topological map 231. Then matcher 234 identifies matching neighboring clients 433. At this time, scheduler 235 selects 434 the neighboring client with the most recent $T_i$ ($T_{imax}$). If the current time ($T_C$) is less than the sum of $T_{imax}$ and a predetermined discovery threshold ($T_D$), $$T_C < T_{imax} + T_D$$

then scheduler 235 sets a flag 437. Otherwise, the flag is not set 436 and the nodes $T_i$ is set to $T_C$. This flag is sent back 438 to primary client 410 along with match information. Primary client 410 then determines 450 whether the flag was set. If the flag was set, primary client 410 remains in SP for the duration of the following SA and SP portions of the cycle and remains discoverable for that duration. If the flag is not set, then primary client 410 goes into SA and performs discovery of other clients.

In another embodiment, scheduler 235 identifies a locality group comprised of a plurality of clients within a predetermined distance from each other and that appear to be stationary relative to each other for a set period of time. Server 230 then sends a message to each client in the locality group, instructing each client to go into SA for the same time interval but starting at different times. This results in staggered discovery for the clients in the locality group. For example, referring to FIG. 2, suppose that the scheduler has identified clients A 211, B 212, C 213, and D 214 to be a locality group. Further, $$IN=T,$$

where I is the number of seconds between each discovery in the locality group, N is the number of clients in the locality group, and T is the number of seconds that each client in the locality group remains in SP. Referring back to FIG. 2, if scheduler 235 determines that discovery in the locality group should be performed once every ten seconds, then I=10 seconds, N=4, and T=40 seconds. Thus, server 230 sends a message to each client instructing each client to go into SA every 40 seconds starting at a different time, with each start time staggered 10 seconds apart. So, client A 211 will be instructed to go into SA at time t and then go back into SP until t+40; client B 212 will be instructed to go into SA at time t+10 and then go back into SP until t+10+40; client C 213 will be instructed to go into SA at time t+20 and then go back into SP until t+20+40; and client D 214 will be instructed to go into SA at time t+30 and then go back into SP until t+30+40. t then gets increased by T for each client after each client goes into SA. When any of the clients in the locality group discover one more or one less client within the predetermined distance, then mapper 233 updates topological map 231, and scheduler 235 changes the composition of the locality group, N, I, and T accordingly.

In a further embodiment, the scheduler keeps track of the time when each client, represented by a node in the topological map, last performed discovery (i.e., went into SA). If the elapsed time from the time a client last performed discovery is greater than a predetermined period of time, then the scheduler sends a message to that client to go into SA and perform discovery.

Figure 5:
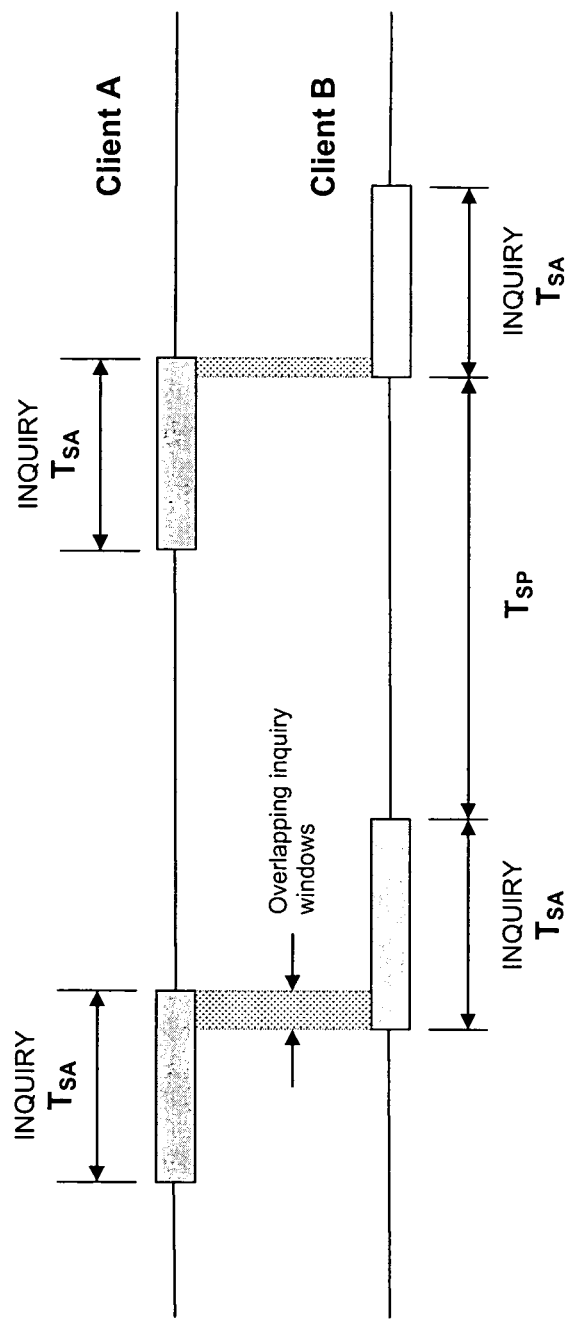
FIG. 5 depicts the interaction between two clients.

Referring to FIG. 5, there is shown the interaction between two clients. The overlapping inquiry windows are times when both clients are in SA and functioning as primary clients during which both are incapable of being discovered by the other. In one embodiment, in order to decrease occurrences and duration of overlapping inquiry windows, $T_D$ should fall within a range. In this embodiment, $T_D$ falls within a range, the lower bound ($T_{LO}$) of which equals the average duration of SA ($T_A$) minus a predetermined allowance of variation in SA duration ($D_{SA}$) minus twice a predetermined allowance of variation in SP duration ($D_{SP}$), $$T_{LO}=T_A-D_{SA}-2*D_{SP}$$

and the upper bound ($T_{H1}$) of which equals the average duration of SA ($T_A$) plus the predetermined allowance of variation in SA duration ($D_{SA}$) Plus twice the predetermined allowance of variation in SP and duration ($D_{SP}$).

$$T_{H1}=T_A+D_{SA}+2*D_{SP}$$

Thus, in this embodiment, $$T_{LO} \leq T_D \leq T_{H1}$$

as $T_D$ increases from $T_{LO}$ to $T_{H1}$, the occurrences and duration of overlapping inquiry windows decreases.

In yet another embodiment, the predetermined discovery threshold is tunable by an administrator based upon the environment that the group of clients 210 are in. For example, the predetermined discovery threshold can be increased or decreased depending on how crowded the environment is.

In all of the embodiments relating to the scheduling of a client's SA or SP, a person skilled in the art should understand that topological map 231 is not necessary. All the information associated with the nodes of topological map 231 can be stored in client information database 232 or any memory module on server 230 instead.

It is intended that the scope of the present invention be defined by the following claims and their equivalents.

What is claimed:

1. A computer-implemented method, comprising:
   at a server having one or more processors for executing instructions in one or more programs:
   responding to identifying information, obtained from a primary client, for a plurality of secondary clients in physical proximity to the primary client, wherein the identifying information is obtained by the primary client using a discovery process adapted to obtain the identifying information of the secondary clients in physical proximity to the primary client for conveyance to the server, by:
   identifying match criteria associated with a particular user who is associated with the primary client;

applying the match criteria to identify a first set of the plurality of secondary clients that match the match criteria and a second set of the plurality of secondary clients that do not match the match criteria; and
sending a response to the primary client in accordance with the identified first set of secondary clients; and
using a scheduler at the server, controlling states of the primary client and the plurality of secondary clients, wherein the states of the primary and secondary clients comprise an active state (SA), characterized by a respective client is being configured to discover other clients, and a passive state (SP), characterized by the respective client is being discoverable by other clients.

2. The method of claim 1, wherein the identified match criteria includes personal preferences of the particular user with respect to other users.

3. The method of claim 1, further comprising:
selecting one of a plurality of distinct user profiles associated with the particular user, and identifying the match criteria from the selected user profile.

4. A computer-implemented method, comprising:
at a server having one or more processors for executing instructions in one or more programs:
responding to identifying information, obtained from a primary client, for a plurality of secondary clients in physical proximity to the primary client, by:
identifying match criteria associated with a particular user who is associated with the primary client,
applying the match criteria to identify a first set of the plurality of secondary clients that match the match criteria and a second set of the plurality of secondary clients that do not match the match criteria, and
sending a response to the primary client in accordance with the identified first set of secondary clients; and
at the server:
using a scheduler at the server, controlling states of the primary client and the plurality of secondary clients, wherein the states of the primary and secondary clients comprise an active state (SA), characterized by a respective client being configured to discover other clients, and a passive state (SP), characterized by the respective client being discoverable by other clients.

5. The method of claim 4, wherein the server includes a client information database to store client information, the client information database including discovery timestamps associated with each of the primary client and the plurality of secondary clients, designating times at which the primary client and each of the secondary clients was most recently in the active state (SA), the method further including the step of:
at the server: scheduling discovery of the primary client and each plurality of secondary clients.

6. The method of claim 5, further including the steps of:
at the server:
updating the client information stored for the primary client with a current time as the discovery timestamp for the primary client;
selecting one of the plurality of secondary clients with the most recent discovery timestamp;
setting a flag only if the current time is less than the discovery timestamp of the selected secondary client plus a predetermined discovery threshold; and
wherein sending a response includes transmitting match information of the plurality of secondary clients that match the match criteria and the flag to the primary client.

7. The method of claim 6, wherein the predetermined discovery threshold is tunable.

8. The method of claim 7, wherein the predetermined discovery threshold is greater than an average duration of the active state (SA) minus a predetermined allowance of variation in duration ($D_{SA}$) of the active state (SA) minus twice a predetermined allowance of variation in duration ($D_{SP}$) of the passive state (SP), but less than the average duration of the active state (SA) plus the predetermined allowance of variation of the active state (SA) duration ($D_{SA}$) plus twice the predetermined allowance of variation in the passive state (SP) duration ($D_{SP}$).

9. The method of claim 5, further comprising the steps of:
at the server:
determining which of the plurality of clients in the client information database are a neighboring client to the primary client;
associating respective discovery timestamps with the primary client and any neighboring client to the primary client to designate the time at which each one of the clients was most recently in the active state (SA);
the scheduling step further includes selecting the neighboring client with the least recent discovery timestamp; and
sending an instruction to the neighboring client to go into the active state (SA).

10. A server for use in a system having a primary client and secondary clients, the server having;
at least one processor;
memory to store one or more programs for execution by the at least one processor; and
a scheduler configured to send a message to a primary client and a plurality of secondary clients to control states of the primary client and a plurality of secondary clients in physical proximity to the primary client, wherein the states of the primary and secondary clients comprise an active state (SA), characterized by a respective client being configured to discover other clients, and a passive state (SP), characterized by the respective client being discoverable by other clients;
wherein the processor is configured to cause the server to respond to identifying information, obtained from the primary client, for the plurality of secondary clients in physical proximity to the primary client, wherein the identifying information is obtained by the primary client using a discovery process adapted to obtain the identifying information of the secondary clients in physical proximity to the primary client for conveyance to the server, by:
identifying match criteria associated with the primary client;
applying the match criteria to identify a first set of the plurality of secondary clients that match the match criteria and a second set of the plurality of secondary clients that do not match the match criteria; and
sending a response to the primary client in accordance with the identified first set of secondary clients.

11. The server of claim 10, wherein the server is configured to send match information of the secondary clients that match the match criteria to a third party.

12. The server of claim 10 further comprising:
a topological map to represent the primary client and the secondary clients, the topological map including nodes to represent the primary client and the secondary clients and edges between the nodes such that each node that represents the primary client is within one edge to the nodes representing secondary clients that the primary client has discovered; and a topological mapper to update the topological map upon the server's receipt of information from the primary client; and wherein the server uses the topological map updated by the topological mapper to identify a list of matching secondary clients.

13. The server of claim 10, wherein the server is configured to transmit match information of the primary client to the identified secondary clients that match the match criteria.

14. The server of claim 13, wherein the match information includes a uniform resource locator (URL).

15. The server of claim 10, wherein the server further includes a client information database to store client information, the client information database including discovery timestamps associated with each of the primary client and the plurality of secondary clients, each respective discovery timestamp indicates the time at which a respective client was most recently in the active state (SA); and the server further includes a scheduler configured to schedule discovery activity of the primary client and the plurality of secondary clients.

16. The server of claim 15, wherein the scheduler is configured to schedule the discovery activity of the primary client by selecting a neighboring secondary client from the plurality of secondary clients with the most recent discovery timestamp and to set a flag if the current time is less than the most recent discovery timestamp plus a predetermined discovery threshold, the server to send the flag along with the match information of one or more of the plurality of secondary clients that match the match criteria to the primary client and to send a message that indicates to the primary client to skip the active state (SA) and remain in the passive state (SP) for the duration of the active state (SA) portion of a respective cycle if the flag is set.

17. The server of claim 16, wherein the predetermined discovery threshold is tunable.

18. The server of claim 16, wherein the predetermined discovery threshold is greater than an average duration of the active state (SA) minus a predetermined allowance of variation in the active state (SA) duration ($D_{SA}$) minus twice a predetermined allowance of variation in the passive state (SP) duration ($D_{SP}$), but less than the average duration of the active state (SA) plus the predetermined allowance of variation in the active state (SA) duration ($D_{SA}$) plus twice the predetermined allowance of variation in the passive state (SP) duration ($D_{SP}$).

19. The server of claim 15, wherein the scheduler is configured to schedule the discovery activity of a neighboring secondary client by selecting the neighboring secondary client with the least recent discovery timestamp, sending an instruction to the neighboring secondary client to go into active state (SA), and sending an instruction to the primary client to skip the active state (SA) and remain in the passive state (SP) for the duration of an active state (SA) portion of a respective cycle.

20. A computer-implemented method, comprising:
at a respective client that is associated with a particular user, the respective client having one or more processors and memory to store one or more programs for execution by the one or more processors:
discovering secondary clients in physical proximity to the respective client by performing a discovery process adapted to obtain identifying information of secondary clients in physical proximity to the respective client for conveyance to a server;
in accordance with the discovering, sending to the server identifying information for a plurality of the secondary clients in physical proximity to the respective client;
receiving from the server a response identifying a subset of the plurality of secondary clients satisfying match criteria, the match criteria associated with the respective client;
displaying information to the particular user in accordance with the response; and
receiving from a server a message to control the state of the respective client, wherein the state of the respective client comprises an active state (SA), characterized by the respective client being configured to discover other clients, and a passive state (SP), characterized by the respective client being discoverable by other clients.

21. The method of claim 20, wherein the match criteria is associated with a user profile of the particular user.

22. The method of claim 20, wherein the respective client sends the server client information to store in a client information database, the client information database including discovery timestamps associated with the respective client and each discovered secondary clients, designating times at which the primary client and each of the secondary clients was most recently in the active state (SA).

* * * * *